United States Patent

[11] 3,578,961

[72] Inventor Ming-tzer Miu
Brighton, Mass.
[21] Appl. No. 710,918
[22] Filed Mar. 6, 1968
[45] Patented May 18, 1971
[73] Assignee Honeywell, Inc.
Minneapolis, Minn.

[54] PRE-CONDITIONED DIVISOR FOR EXPEDITE DIVISION BY SUCCESSIVE SUBTRACTION
12 Claims, 3 Drawing Figs.

[52] U.S. Cl. .......... 235/159
[51] Int. Cl. .......... G06f 7/52
[50] Field of Search .......... 235/159, 160, 156, 164

[56] References Cited

UNITED STATES PATENTS

| | | | |
|---|---|---|---|
| 3,234,367 | 2/1966 | Ottaway et al. | 235/160X |
| 3,028,086 | 4/1962 | Sierra | 235/160 |
| 3,234,366 | 2/1966 | Davis et al. | 235/159X |

*Primary Examiner*—Malcolm A. Morrison
*Assistant Examiner*—David H. Malzahn
*Attorneys*—Fred Jacob, Leo Stanger and Robert J. Zinn

ABSTRACT: A digital divider wherein the divisor is first preconditioned to a value which renders it more easily divisible into the dividend. Once the divisor has been optimized and the value of the dividend adjusted accordingly, actual division is effected by alternately testing the high order digits of the partial remainder and subtracting multiples of the preconditioned divisor accordingly.

Patented May 18, 1971 3,578,961

2 Sheets-Sheet 1

INVENTOR
MING-TZER MIU

BY Robert J. Zinn
ATTORNEY

INVENTOR
MING-TZER MIU
BY Robert S. Zinn
ATTORNEY

PRE-CONDITIONED DIVISOR FOR EXPEDITE DIVISION BY SUCCESSIVE SUBTRACTION

BACKGROUND OF THE INVENTION

Of the numerous arithmetic operations performed in conventional electronic data processing apparatus decimal division is perhaps the most difficult to perform. Conventionally, division may be though of as the inverse of multiplication: however, because of difficulties encountered in the division process which are not found in multiplication, division becomes a substantially more complex operation.

It is possible to perform decimal multiplication and division by a relatively straight forward series of additions and subtractions; however, this iterative method is frequently deemed not satisfactory because of speed considerations. In order to increase the speed of operation, a number of refinements have been proposed. The present invention is concerned with one such refinement as applicable to a divide apparatus.

In contrast to multiplication, there is one significant difference in division in that in multiplication, the multiplier digits are available to establish the number of times the multiplicand is to be added to itself and/or the partial product, while in division there is no immediate way to ascertain the number of times the divisor will fit into the dividend, i.e. the value of the respective quotient digits.

A straightforward solution to this problem is effected by initiating successive subtractions of the divisor from the dividend until an overflow condition is detected, i.e. the last subtraction results in a negative remainder. Detection of the overflow condition is followed by a restoration operation which restores the remainder to a positive value by adding to it the value of the divisor.

Another division scheme which has received extensive use concerns the development of selective multiples of the divisor which, may be pregenerated and stored whereafter they may be subtracted from the dividend in a standard sequence. If an attempt at subtracting any one of the multiples results in a negative remainder, a restoration operation similar to that outlined above is performed whereupon an attempt is made to subtract the next lower order multiple.

In an attempt to further improve the operating speed of the division process, implementations have been proposed wherein the quotient digits are arrived at by performing a series of educated guesses in a manner similar to the pencil-and-paper method of performing division. The divisor is "compared" with the dividend or remainder and a trial quotient digit is selected. The divisor is then multiplied by the trial quotient digit and the result subtracted from the appropriate orders of the dividend. If the remainder is positive and less than the divisor, the trial quotient digit is the correct quotient digit. If the trial product is greater than the associated portion of the dividend, the trial remainder is positive. The comparison of the divisor and dividend can be made in a variety of ways. In this respect, elaborate comparison tables have been generated in which the highest order divisor digit is compared with the highest order nonzero digit in the remainder. These two values define coordinates in a lookup table in which is stored the trial quotient digit.

In the prior art techniques it has been recognized that the accuracy with which the trial quotient can be predicted is proportional to the number of digits of the divisor and dividend which are compared. At the same time, the complexity of the lookup table increases as the square of the number of digits to be compared. Thus, if the high order digit of the divisor and dividend are compared a lookup table of 81 values is required. If the first and second high order digit is compared with the first and second high order digit of the dividend, the number of entries in the lookup table increases to 8100.

It is therefore the primary object of the present invention to provide a division apparatus which performs division by an educated guess technique with accuracy and speed commeasurate with that of a device capable of comparing first and second high order digits in both the divisor and dividend, while necessitating less in terms of hardware than that required to compare the high order digit only of the divisor and dividend.

A division system constructed in accordance with the principles of the present invention achieves this and other objects through the use of a preconditioning operating performed on the original divisor to assure that the first two digits of the divisor assume a value between 1.0 and 1.9. Having preconditioned the divisor to this range of values, there results an even more significant reduction in terms of the possible trial multiples of the divisor digit which must be allowed for.

Ideally, the value of the high order digit of the divisor is preconditioned to a nine. This results in an optimal divisor inasmuch as one is then assured of generating as a corresponding quotient digit, the value of the high order digit of the dividend or the high order digit of the dividend plus one. Preconditioning the divisor in order to assure the generation of a nine in the high order digital position is not at all easy and in fact no practical implementation is known at this time.

In the implementation of the preferred embodiment of the present invention, the most significant nonzero digit of the divisor is first tested and if not equal to one, the divisor added to itself whereupon the highest order digit of the resultant sum is again tested to ascertain if it is now a one. If not, the value of the resultant sum is added to itself and a new test of the high order digit of the result initiated. This continues until a high order one is detected. When operating in the decimal mode, worst case considerations require three successive additions to assure the generation of a one in the high order digital position. Once the conditioned divisor has been generated, select multiples thereof are generated and stored for subsequent use in the actual division operation. The dividend is next modified to compensate for the modified value of the original divisor. The original ratio of divisor to dividend is restored by adding the value of the dividend, or the value of the resultant sum, to itself the same number of times as was effected for the divisor during the preconditioning operation. Having preconditioned both the divisor and dividend and generated the selective multiples of the divisor, the two most significant digits of the dividend are sensed and a predetermined sequence of arithmetic operations is initiated in accordance therewith, whereby an appropriate quotient digit is generated and the original dividend is reduced to a partial remainder, whose value falls within a predetermined range with respect to the preconditioned divisor. The foregoing cycle of operation is repeated; subsequent repetitions being effected until a predetermined number of quotient digits has been generated.

DESCRIPTION OF PREFERRED EMBODIMENT

Figure 1:
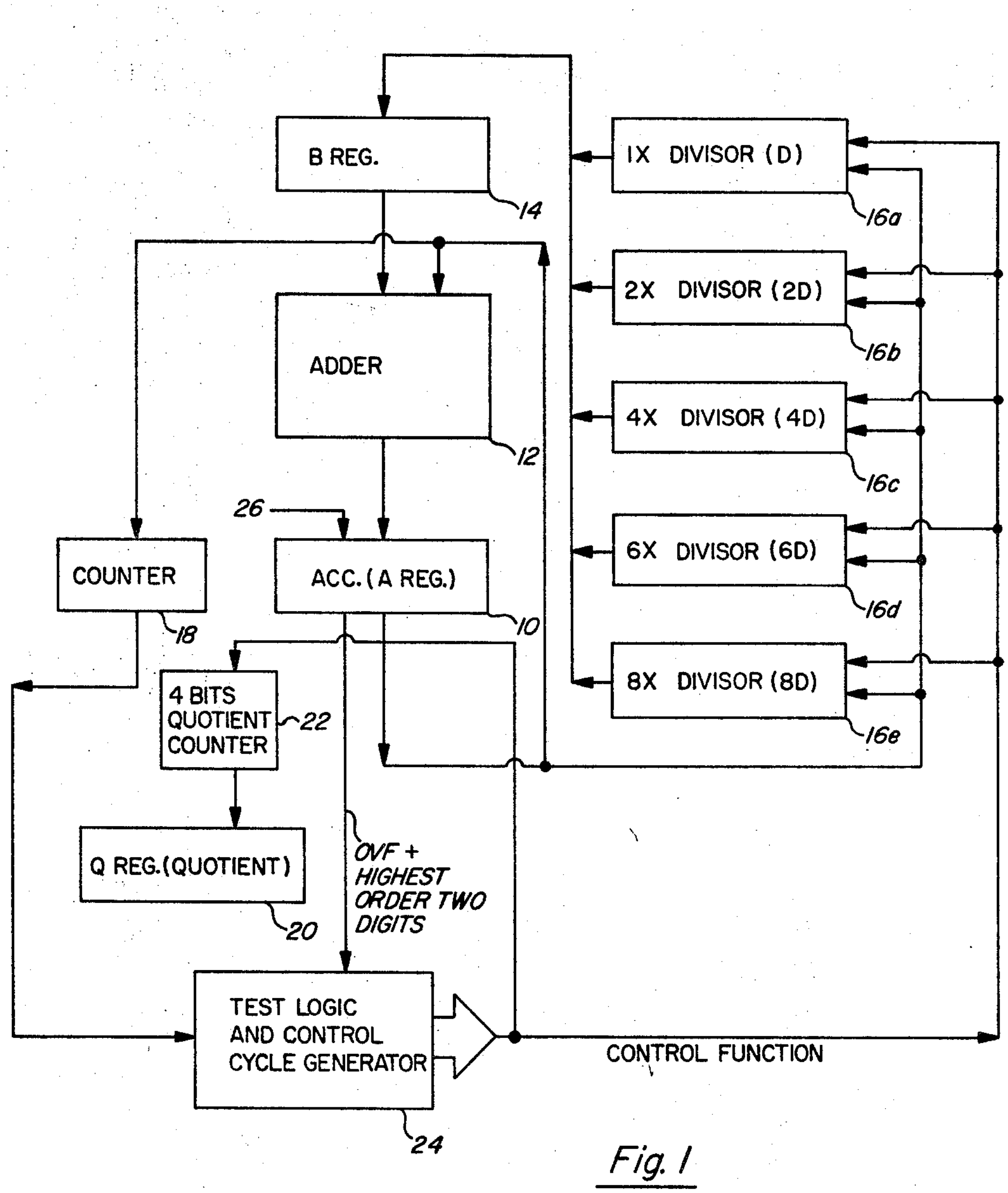
FIG. 1 is a diagrammatic showing of the present invention.

The apparatus diagrammatically illustrated in FIG. 1 comprises the basic elements of an apparatus for dividing one binary coded decimal number into another. The numeral 10 identifies an accumulator register (A register) of conventional design having an ability to incrementally shift the contents thereof, or alternatively transfer the entire contents thereof. The accumulator 10 may take the form of a series of interconnected bistable flip-flops having appropriate coupling circuits as is conventional in the implementation of such devices. Each such bistable device is characterized by two stable operating states which for purposes of explanation will be referred to as being either affirmative or negative depending on whether a binary one or zero is being represented therein. Four such bistable devices are required to represent each decimal digit of the operands being manipulated. The significance of this relationship should be more readily appreciated from the explanation given below with respect to FIG. 1A.

Connected as an input to the accumulator 10 is an arithmetic circuit 12 which may take the form of the high speed parallel adder described in the patent to Joseph F. Kruy, bearing Ser. No. 293,007, which issued as U.S. Pat. No. 3,243,584. An alternative arrangement which may be utilized for character-oriented operation is that described in the copending application of William Maczko and Walter R. Lethin bearing Ser. No. 376,348, now U.S. Pat. No. 3,700,259, and filed June 19, 1964.

Associated with the input of the adder is an auxiliary register (B register) 14 which serves as a buffer register between a source of pregenerated divisor multiplies **16*a* through 16*e* and the adder 12**.

A counter 18 is shown connected to the output of the accumulator register 10 and is used during the preconditioning phase of the division operation to keep track of the number of times the divisor has been added to itself. As indicated above, the dividend must be compensated accordingly. For purposes of implementing the preferred embodiment of this invention, the counter 18 may be a conventional two-bit counter. The two-bit capability of the counter 18 is sufficient to represent the worst case preconditioning operation required to complete the conditioning of the divisor.

Continuing with the description of FIG. 1, it will be noted that the basic system further comprises a quotient (Q register) 20 for storing the respective digits of the quotient as they are generated. Associated with the Q register 20 is a four-bit quotient counter 22 which stores the trial quotient digit during the phase thereof. The quotient counter 22 may be of conventional design, having the ability to digitally increment or decrement the contents thereof. The functional relationship of the counter 22 with respect to the accumulator 10 and the Q register 20 will be more readily apparent from the explanation of operation of the divide apparatus which follows.

Operatively connected to the aforementioned components is a test logic and control cycle generator 24. The test logic and control cycle generator 24 serves a dual purpose in that the test logic initially serves to monitor the value of the high order digit of the divisor during the preconditioning operation performed thereon. Subsequently, other portions of the test logic serve to examine the two most significant digits of the dividend to in turn establish which one of seven possible states will be used to generate the corresponding quotient digit. The control cycle generator portion of member 24 is operative during the successive cycles of the sequential subtraction phase of the division operation, in response to signals generated in the associated test logic, to effect the selection and transfer of the appropriate multiple of the preconditioned divisor to the adder 12. The control cycle generator portion of member 24 has control signal leads (not shown) connected to gating circuitry associated with all operative portions of the apparatus of FIG. 1 to control the sequence of operations thereof. The control cycle generator may be of a conventional design such as is described in the patent to Henry W. Schrimpf, bearing Ser. No. 636,256, which issued as U.S. Pat. No. 3,201,762. Alternatively, a more flexible form of control cycle generator may be used, such as is disclosed in the copending application of George S. Hoff and Ming-Tzer Miu bearing Ser. No. 694,949 and filed Jan. 2, 1968.

Consideration will now be given to an explanation of the operation of the above-outlined apparatus. In this respect, a typical division operation is initiated in the apparatus of FIG. 1 by first introducing the divisor into the accumulator 10 of FIG. 1 via a line 26. The divisor operand once introduced into the accumulator is justified whereby the highest order nonzero digit is shifted left until it occupies the second highest order state of the accumulator. The next operation is the preconditioning of the divisor, i.e. make the highest order digit of the divisor equal to one. This is effected by testing the most significant nonzero digit, which if not equal to one, will result in the divisor being added to itself until a new divisor is formed wherein the most significant digit is a one.

As an example, consider an original divisor $D_0$ equal to 5678. The initial test condition reveals that the high order nonzero digit (i.e. 5) is not equal to one. Accordingly, the contents of the accumulator 10 are transferred into the adder 12 wherein the value so entered in added to itself.

The result of this operation (5678 plus 5678) equal 11356 and the resultant test on the high order digit indicates that it now is a one. The fact that the original divisor was added to itself will be stored in the counter 18 and used to compensate the dividend operand accordingly.

As simple example, consider an original divisor $D_o$ equal to 2345. The initial test performed on the high order digit of the divisor is negative, i.e. the high order digit is not a one. Adding the divisor to itself (2345 plus 2349) yields a value 4690 wherein the high order digit is still not a one. Similarly, adding 4690 to itself yields a value 9380, wherein the high order digit is still not a one. Adding 9380 to itself yields a value 18760 wherein the high order digit is a one, thus satisfying the conditions for an acceptable divisor.

Figure 1A:
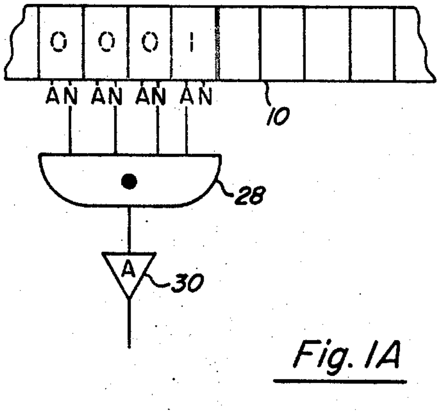
FIG. 1A is a diagrammatic representation of test logic associated with the accumulator register of FIG. 1.

Reference is now made to FIG. 1A which shows a portion of the accumulator register 10 having an And gate 28 and an amplifier 30 associated with the four-bit positions necessary to represent a single digit of an operand represented therein. As indicated above, each of the bistable devices comprising the represented portion of the accumulator 10 have both an affirmative and negative state indicative of a binary one or zero respectively. The conditioning leads from the multiple bistable devices are connected to AND gate 28 of FIG. 1A in such a manner that the latter is satisfied only by a bit representation 0001 indicative of a decimal one for the high order digit of the divisor.

Since the divisor as originally entered into the accumulator, was justified to a position such that the high order nonzero digit was positioned in the second high order digital portion of the accumulator 10, the test logic of FIG. 1A is immediately responsive to indicate a high order one digit for the divisor. If in fact the high order digit is not a one, the operand may be shifted right one digital position prior to entering the value thereof in the adder preparatory to initiating the successive additions to itself. In this manner, the first time a high order one digit is generated in the conditioning phase of operation being performed on the divisor, it will be detected by the circuitry of FIG. 1A.

Having completed the preconditioning operation on the divisor and having the latter available in the accumulator register, it is convenient to complete the generation of the selective multiples of the preconditioned divisor. In one embodiment of the present invention, the selective multiples are generated by transferring the digital representation of the preconditioned divisor into the register 16A and from thence into the adder 12 via the B register 14. In the adder, the value of the preconditioned divisor is added to itself and the resultant sum transferred to the accumulator 10 for both storage in register 16B and reintroduction into the adder 12. By repeating this operation during successive cycles, it is possible to generate the multiples D, 2D, 4D, 6D and 8D in just four add cycles.

The fact that the divisor was initially justified so that the high order digit of the preconditioned version thereof occupied the second highest order digital position of the accumulator register, means that at most the high order digital position of the accumulator will be occupied by the selective multiples thereof. It follows from this that in a word-oriented system the accumulator register 10 and the auxiliary registers **16*a* through 16*e***, should accommodate two digits in excess of those comprising the longest operand. In a character-oriented system this latter restriction has no real significance.

Having preconditioned the divisor and generated the selective multiples thereof, the next phase of operation concerns the compensation of the dividend in order to restore the original ratio between the latter and the preconditioned divisor. To compensate the dividend, it is only necessary during the first cycle thereof to add the value of the original dividend to itself, and during succeeding cycles to add the value of the resultant sum to itself, a number of times equal to the count registered in the counter 18. This operation is effected by initially clearing the accumulator 10 and introducing therein the value of the dividend via line 26. After initial justification of the dividend operand in the accumulator register 10, the above-outlined operation of adding the dividend to itself is initiated. Once the divisor and the dividend have both been preconditioned and the necessary multiples of the division have been generated and stored in the registers **16*a* through 16*e***, the system is then prepared to perform the initial subtractive cycles of the division operation.

By preconditioning the divisor and examining the two most significant digits of the dividend, one of seven predetermined sequences of operations is all that will be required to successfully complete the generation of each quotient digit. Although not shown, the test circuitry required to identify these seven states is of conventional design and may be of the type disclosed in FIG. 1A above. In this respect, circuitry similar to that disclosed in FIG. 1A will be associated with both the high order digital positions of the accumulator register, so as to identify the numeric value of these two high order digits.

Figure 2:
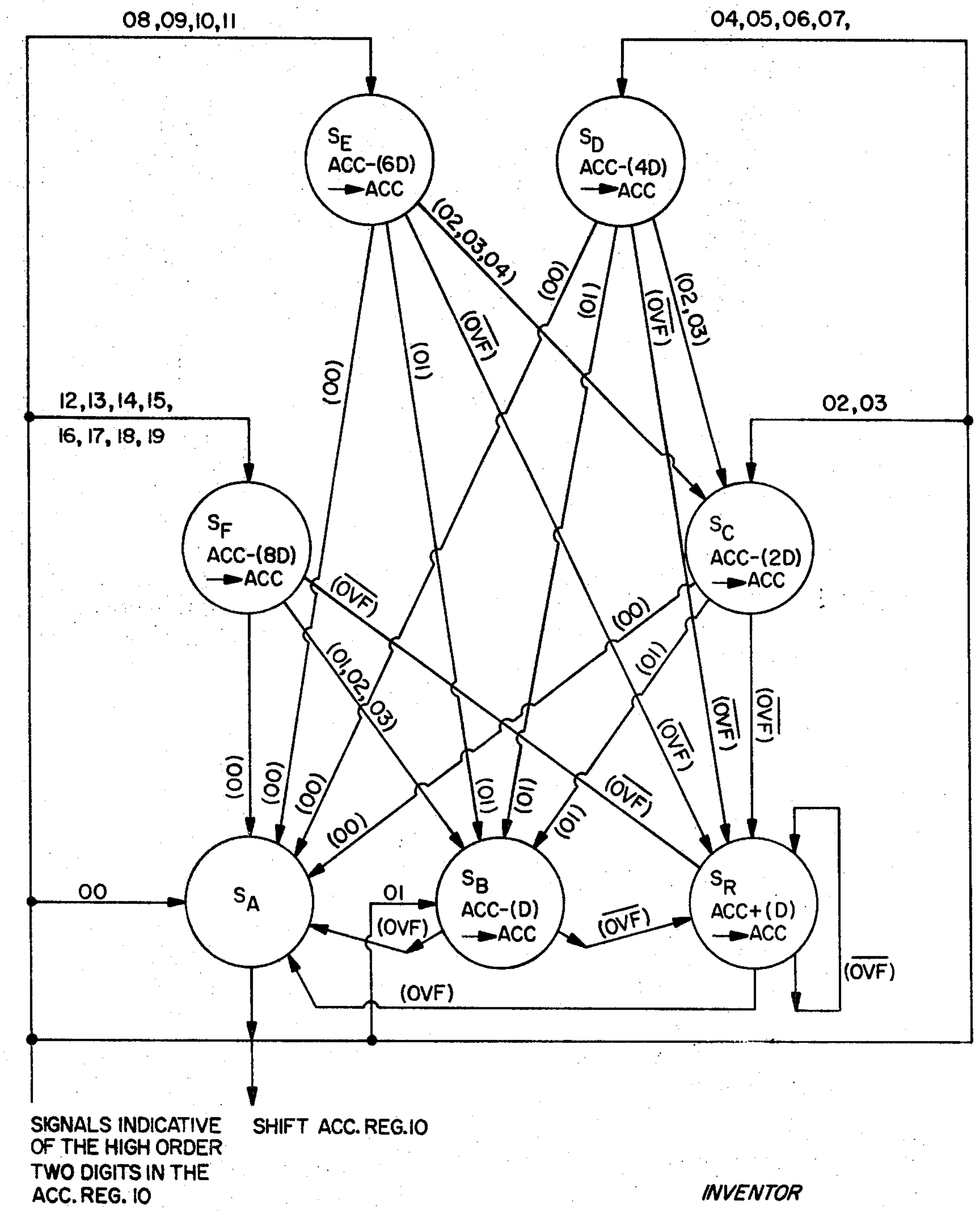
FIG. 2 is a flow diagram depicting the operative states of the subject invention.

Reference is now made to FIG. 2 which discloses a flow diagram which depicts the seven operative states ($S_A$, $S_B$, $S_C$, $S_D$, $S_E$, $S_F$ and $S_R$) which may occur as a result of the possible combination of the two high order digits of the dividend. In the interpretation of FIG. 2, the unbracketed sets of numerals appearing on the various lines leading into the respective states depict the sensed digital combinations of the dividend which define a particular state; while the bracketed sets of numerals on the other lines depict the internal sequence of operations which may result as a consequence of the operative state initiated by the two high order digits of the dividend, the exact nature of the sequence being defined by the two high order digits of the partial remainder resulting from the previous state function.

It may be helpful in attempting to further understand FIG. 2 to note that states $S_A$ through $S_F$ are initially entered in accordance with the value of the two most significant digits of the dividend or partial remainders thereof contained in the accumulator register. The high order two digits of the dividend of partial remainder thereof, which results in the respective states are shown as being directed thereto from the lines forming the periphery of FIG. 2. State $S_R$ concerns a restoration operation required to restore a partial remainder to a positive value in case of oversubtraction. The symbol $\overline{OVF}$ indicates that a previously initialed subtraction operation was unsuccessful and that a compensating step needs to be performed to restore the dividend or partial remainder to a positive value. Once the partial remainder has been successfully restored a signal OVF is generated. State $S_R$ can only be entered as a result of an internal transfer from one state to another. Egress from the state diagram of FIG. 2 can only be made from the $S_A$ state which means that the high order digits of the partial remainder must have the value 00, or in some instances 01. Satisfaction of the $S_A$ state conditions results in a one digit shift to the left of the contents of the accumulator register 10 and a corresponding transfer of the contents of the low order quotient counter 22 to the Q register 20.

A further understanding of the significance of FIG. 2 is facilitated by reference to Table 1 which follows:

TABLE 1

| States | Symbol | Action | If highest order two digits of ACC equal to— | Then next state will be |
|---|---|---|---|---|
| A | $S_A$ | Shift ACC one digit to the left; deliver Quotient counter to the lowest digit of Quotient register; shift Quotient register one digit to the left; and clear the quotient counter. | 00<br>01<br>02, 03<br>04–07<br>08–11<br>12–19 | A<br>B<br>C<br>D<br>E<br>F |
| B | $S_B$ | Deliver ACC–D to ACC<br>Add 1 to Quotient Counter | OVF<br>$\overline{OVF}$ | A<br>R |
| C | $S_C$ | Deliver ACC–2D to ACC<br>Add 2 to Quotient Counter | 00<br>01, 02<br>$\overline{OVF}$ | A<br>B<br>R |
| D | $S_D$ | Deliver ACC–4D to ACC<br>Add 4 to Quotient Counter | 00<br>01<br>02, 03<br>$\overline{OVF}$ | A<br>B<br>C<br>R |
| E | $S_E$ | Deliver ACC–6D to ACC<br>Add 6 to Quotient Counter | 00<br>01<br>02, 03, 04<br>$\overline{OVF}$ | A<br>B<br>C |
| F | $S_F$ | Deliver ACC–8D to ACC<br>Add 8 to Quotient Counter | 00<br>01, 02, 03<br>$\overline{OVF}$ | A<br>B<br>R |
| R | $S_R$ | Deliver ACC+D to ACC<br>Subtract 1 from the Quotient Counter then go to SR if $\overline{OVF}$ or go to SA if OVF. | ----------- | ----------- |

Table 1 gives a concise explanation of the operation to be effected in the apparatus of FIG. 1 upon determination of the applicable state in accordance with the sensing of the two high order digits of the dividend or partial remainder thereof. In this respect, the first column of Table 1 indicates the applicable state while column 2 indicates the corresponding symbolic representation of the state function as depicted in FIG. 2. Column 3 gives an explanation of the operation which is performed in the adder 12 of FIG. 1 including the appropriate one of the preconditioned divisor multiples to be utilized in the subtract operation. Column 4 is to be interpreted with column 5 and indicates the internal transition of states, which transition is predicated upon the resultant value of the two high order digits of the partial remainder after the indicated action has been taken.

In the interpretation of Table 1, it should be noted that for the first cycle of operation, the high order digital position of the accumulator register 10 must contain a zero since the preconditioned dividend stored therein will not occupy the high order digital position, the original dividend having been justified to the third digital position to the right of the lefthand end of the accumulator register 10. This means that the compensated or preconditioned dividend value at best occupies the second highest order digital position. For this reason, during the first cycle, the conditions indicated under state A in Table 1 are all possible with the exception of the high order digital values 10 through 19.

In further explanation of the operation of the present invention, consider the following example of a division operation wherein: Original Divisor (DO)=63289; Preconditioned Divisor ($DO_c$)=126578; Original Dividend (DI)=56785293; Preconditioned Dividend ($DI_c$)=113570586. Selective Multiples of $DO_c$:

$1\times DO_c = 0\,1\,2\,6\,5\,7\,8$
$2\times DO_c = 0\,2\,5\,3\,1\,5\,6$
$4\times DO_c = 0\,5\,0\,6\,3\,1\,2$
$6\times DO_c = 0\,7\,5\,9\,4\,6\,8$
$8\times DO_c = 1\,0\,1\,2\,6\,2\,4$

| State | Contents of ACC Reg. 10 | Hi Order 2 Digits | Action | Quo. Reg. | Quo. Cr |
|---|---|---|---|---|---|
| | 0 1 1 3 5 7 0 5 8 6 | 0 1 | State B Indicated | - - - - | - |
| B | 0 1 2 6 5 7 8 | | ACC - D to ACC<br>Add 1 to Quo. Cn. | - - - - | 1 |
| | 9 9 8 6 9 9 2 5 8 6 | 9 9 | $\overline{OVF}$-State R Indicated | | |
| R | 0 1 2 6 5 7 8 | | ACC + D to ACC<br>Subtract 1 from Quo. Cn. | - - - - | 0 |
| | 0 1 1 3 5 7 0 5 8 6 | 0 1 | State A Indicated | | |
| A | 1 1 3 5 7 0 5 8 6 | | Shift ACC 1 digit left<br>Deliver Quo Cn to Quo Reg.<br>Shift Quo Reg. 1 digit left<br>Clear Quo Cn. | - - - 0 | - |
| | 1 1 3 5 7 0 5 8 6 | 1 1 | State E Indicated | | |
| E | 0 7 5 9 4 6 8 | | ACC - 6D to ACC<br>Add 6 to Quo Cn. | - - - 0 | 6 |
| | 0 3 7 6 2 3 7 8 6 | 0 3 | State C Indicated | | |
| C | 0 2 5 3 1 5 6 | | ACC - 2D to ACC<br>Add 2 to Quo Cn. | - - - 0 | 8 |
| | 0 1 2 3 0 8 1 6 8 | 0 1 | State B Indicated | | |
| B | 0 1 2 6 5 7 8 | | ACC - D to ACC<br>Add 1 to ACC | - - - 0 | 9 |
| | 9 9 9 6 5 0 3 8 6 | 9 9 | $\overline{OVF}$-State R Indicated | | |
| R | 0 1 2 6 5 7 8 | | ACC + D to ACC<br>Subtract 1 from Quo Cn. | - - - 0 | 8 |

| State | Contents of ACC Reg. 10 | Hi Order 2 Digits | Action | Quo. Reg. | Quo. Cn. |
|---|---|---|---|---|---|
| | 0 1 2 3 0 8 1 8 6 | 0 1 | State A Indicated | | |
| A | 1 2 3 0 8 1 8 6 | | Shift ACC 1 digit left<br>Deliver Quo Cn to Quo Reg.<br>Shift Quo Reg 1 digit left<br>Clear Quo Cn. | - - 0 8 | - |
| | 1 2 3 0 8 1 8 6 | 1 2 | State F Indicated | | |
| F | 1 0 1 2 6 2 4 | | ACC - 8D to ACC<br>Add 8 to Quo Cn. | - - 0 8 | 8 |
| | 0 2 1 8 1 9 4 6 | 0 2 | State B Indicated | | |
| B | 0 1 2 6 5 7 8 | | ACC - D to ACC<br>Add 1 to Quo Cn. | - - 0 8 | 9 |
| | 0 0 9 1 6 1 6 6 | 0 0 | State A Indicated | | |
| A | 0 9 1 6 1 6 6 | | Shift ACC 1 digit left<br>Deliver Quo Cn to Quo Reg<br>Shift Quo Reg 1 digit left<br>Clear Quo Cn. | - 0 8 9 | - |
| | 0 9 1 6 1 6 6 | 0 9 | State E Indicated | | |
| E | 0 7 5 9 4 6 8 | | ACC - 6D to ACC<br>Add 6 to Quo Cn. | - 0 8 9 | 6 |
| | 0 1 5 6 6 9 8 | 0 1 | State B Indicated | | |
| B | 0 1 2 6 5 7 8 | | ACC - D to ACC<br>Add 1 to Quo Cn. | - 0 8 9 | 7 |
| | 0 0 3 0 1 2 0 | 0 0 | State A Indicated | | |
| A | 0 2 0 1 2 0 | | Shift ACC left 1 digit<br>Deliver Quo Cn to Quo Reg. | 0 8 9 7 | - |

The fact that the high order digit of the Quotient has been shifted to the extreme left of the Quotient Register 20 may be used to terminate the division operation. Alternatively, a preset counter (not shown) may be connected to the output of the Quotient Counter so as to terminate the division operation after a predetermined number of Quotient digits has been generated.

The results of the above operation may be compared directly with those obtained by a conventional division routine as follows:

```
           0897
63289)56785293
      506312
       615409
       569601
        458083
        443023
         15060
```

The above example of a division operation performed in accordance with the principles of the present invention, reflects a mode of operation which, in response to an unsuccessful subtract condition ($\overline{OVF}$) necessitates additional time to restore the dividend or partial remainder to a positive value. An alternative mode of implementing the subject invention results in a savings of approximately 0.15 subtract cycles per quotient digit. In this respect, the B state is so implemented that prior to the actual subtraction of the divisor from the dividend or partial remainder, an unsuccessful subtract test is made which immediately indicates whether or not pending subtract operation will be successful. If an $\overline{OVF}$ condition is detected, the original contents of the accumulator register are restored and the operation automatically shifts to the $S_A$ state. If the initial test indicates that the pending subtraction operation will be successful, the operation continues as outlined in Table 1; with the value presently in the accumulator register minus the value of the preconditioned divisor prestored to the accumulator register and a one added to the value in the quotient counter.

The selective multiples employed in the actual subtraction phase of the subject division operation, enjoy no unique significance and in fact may be replaced by a more extensive set of multiples or a lesser number with commeasurate consequences in operating speed. For the multiples realized in the implementation of the preferred embodiment of the present invention an average of two subtractions per quotient digit is realized. This figure is to be contrasted with figures of 6.5 subtraction operations per quotient digit for straight-subtract techniqued, 5.5 subtractions per quotient digit for straight-subtract with inhibited delivery for unsuccessful subtraction; and, 4.5 subtraction operations per quotient digit for known educated guess techniques.

While in accordance with the provisions of the statutes, there has been illustrated and described the best form of the invention known, it will be apparent to those skilled in the art that changes may be made in the apparatus described without departing from the spirit of the invention as set forth in the appended claims and that in some cases, certain features of the invention may be used to advantage without a corresponding use of other features.

I claim:

1. In an apparatus for effecting division by the technique of over-and-over subtraction of a divisor or a multiple thereof from a dividend, characterized by a preconditioning step wherein the value of the divisor is modified so as to render it more easily divisible into said dividend, said combination comprising means to sense the high order digital value of said divisor; arithmetic means for performing mathematical operations; means, including control means and connected to said sensing means and said arithmetic means, to modify the numeric value of said divisor until a signal is received in said control means from said sensing means indicating that the high order digital value of said divisor has assumed a predetermined value; and means including said control means to compensate said dividend in a manner which restores the original ratio between said divisor and dividend.

2. An apparatus for performing decimal divide operations wherein a multi digit divisor is divided into a similar multi digit dividend with resultant quotient digits generated therefrom, said apparatus characterized by a preconditioning operation wherein the numeric value of the divisor is modified so that the high order digit thereof assumes a value of 1 whereby the quotient digits may be generated with a higher degree of predictability, said apparatus comprising first register means for initially storing multibit representations of the respective digits of said divisor; test logic means, including sensing and generating means and connected to said first register means, to sense the bit combination depicting at least the high order digit of said divisor and for generating a particular output signal whenever the high order digit of said divisor assumes the value 1, an adder connected to both the output and the input of said first register means; control logic means connected to said sensing means, said first register means, and said adder for initiating the transfer of the digital representation in said first register means to said adder whereby said divisor is continuously added to itself until the high order digital value thereof assumes the value 1.

3. In the apparatus of claim 2, a counter connected to said sensing means, said first register means, and said adder to register the number of times the contents of said first register means has been added

4. A division apparatus wherein division is performed by the technique of over-and-over subtraction and wherein the divisor is first preconditioned to assume a value which renders it more readily divisible into said dividend, said apparatus comprising an adder, a multistate register, means connecting said adder to said multistage register both to receive information therefrom and to deliver information thereto, sensing means connected to the high order digital stages of said multistage register to sense for a predetermined digital combination of the information stored therein, and control means connected to said last-named means for transferring the contents of said multistage register to said adder for repeated addition to itself pending the detection of said predetermined digital combination by said sensing means.

5. Apparatus for dividing a multidigit dividend by a multidigit divisor and for generating a plurality of quotient digits in consequence thereof, comprising a multistage register for storing said divisor, means connected to selective stages of said multistage register to sense the digital significance of the corresponding portion of the divisor stored therein, arithmetic means connected to said first multistage register to receive information therefrom and deliver information thereto, control signal generating means connected to said means for sensing the significance of the digital representation stored in said selective stages of said register for storing said divisor and for directing said arithmetic means to repeatedly add the value of said divisor unto itself a number of times until predetermined conditions in said sensing means have been satisfied, and means operative on cessation of said repetitive addition cycles to substitute said dividend for said divisor in said multistage register and to effect a like number of self-additions to the contents of said multistage register whereby as a result of the preconditioning operations performed on said operands said divisor will be more readily divisible into said dividend.

6. A division apparatus wherein the generation of a single quotient digit corresponding to the division on one order of the dividend by a divisor is effected by an iterative subtraction technique wherein selective multiples of a preconditioned divisor as generated and stored for use during said iterative subtraction operations, said division apparatus comprising a first register initially storing a digital representation of said divisor, arithmetic means connected to said first register to receive information therefrom and deliver information thereto, means connected to said first register to sense the value of the high order digit of said divisor, to ascertain whether the high order digital significance thereof satisfies a predetermined condition, control means connected to said sensing means and to said first register and said arithmetic means whereby the original value of said divisor as stored in said first register is transferred to said arithmetic means and repeatedly added to itself, said control means being effective after each such repeated addition operation to transfer the resultant sum to said first register wherein said sensing means is further operative to ascertain whether the high order digit thereof satisfies said predetermined condition, means including said control means to repeat said addition operations until said sensing means indicate said predetermined conditions are satisfied, means including said arithmetic means and said control means operative upon detection of said predetermined high order digit in said divisor to generate said selective multiples of said preconditioned divisor, means to store said selective multiples as they are generated, means connected to said storage means and said first register means operative on the successful conclusion of said selective multiples generation and storage operation to substitute a digital representation of said dividend for the digital representation of said divisor previously stored in first register means, means connected to said first register means to compensate the value of said dividend in proportion to the modification rendered to the original divisor, and means including said sensing means and said control means and connected to said multiple storage means and said first register means to effect the subtraction of selected multiples of said preconditioned divisor and for storing the quotient digits resulting therefrom.

7. A divider for a digital computer comprising first register means initially storing a digital representation of a divisor, sensing means associated with at least the high order two digital positions of said first register means, an adder having both inputs and outputs connected to said first register means, logic means connected to said sensing means to test the numeric value of the digital representation stored therein and to generate control signals as a consequence thereof, said last-named means further connected to said first register means and said adder to initiate the repetitious addition of the contents of said first register to itself until a signal representation is generated in said sensing means indicating that the original divisor has been preconditioned to a value such that the high order digit thereof assumes a predetermined value, a plurality of auxiliary registers operatively connected to receive and store selective multiples of said preconditioned divisor, means including said logic means to initiate the generation of said selected multiples of said divisor and for storing them in said auxiliary registers, means including said first register means for storing the digital representation of a dividend and for modifying the value of said dividend so as to restore the original ratio of said divisor and dividend, a quotient counter for storing the interim value of quotient digits generated as a result of successive subtractions of said plurality of multiples of the divisor from a particular digital position of the dividend or partial remainder thereof, a quotient register for receiving the final count registered in said quotient counter for a particular digital position of said dividend, means including said test and control signal generating means responsive to a digital representation corresponding to the two high order digits of the dividend to dictate the sequence of successive subtraction operations to be performed on said dividend or partial remainder thereof and upon a determination that said two high order digits of said dividend are of particular value to transfer the contents of said quotient counter to said quotient register while at the same time shifting the contents of said first register means one digital position preparatory to the initiation of a new sequence of successive subtraction operations corresponding to the next lower order quotient digit for said dividend.

8. A divider for a digital computer comprising:

an accumulator having an ability to store a digital representation of a divisor and to incrementally shift the contents thereof, an adder having both inputs and outputs connected to said accumulator, a test logic and control cycle generator connected to said accumulator and said adder for monitoring the value of the high order digit of the divisor, for initiating the repetitious addition of the contents of said accumulator to itself until the original divisor has been preconditioned to a value such that the high order digit thereof assumes a predetermined value, and for generating selective multiples of said preconditioned divisor;

a plurality of auxiliary registers operatively connected to said generator to receive and store said multiples;

means including said accumulator for storing the digital representation of a dividend and for modifying the value of said dividend so as to restore the original ratio of said divisor and dividend;

a quotient counter for storing the interim value of quotient digits generated as a result of successive subtractions of said plurality of multiples of the divisor from a particular digital position of the dividend or partial remainder thereof; and a quotient register for receiving the final count registered in said quotient counter for a particular digital position of said dividend;

said test logic and control cycle generator further responsive to a digital representation corresponding to the two high order digits of the dividend to dictate the sequence of the successive subtraction operations to be performed on said dividend or partial remainder thereof and to transfer upon a determination that said two high order digits of said dividend are of a particular value, the contents of said quotient counter to said quotient register while at the same time shifting the contents of said accumulator one digital position preparatory to the initiation of a new sequence of successive subtraction operations corresponding to the next lower order quotient digit for said dividend.

9. A method of division employing over-and-over subtraction of a divisor or a multiple thereof from a dividend, which comprises:

performing the following steps within a machine:

storing the multibit representation of the digits of said divisor, preconditioning by machine the bit representation of the high order digital value of said divisor to assume a predetermined value, generating by machine selective multiples of the conditioned divisor, compensating by machine the multibit representation of said dividend in a manner which restores the original ratio between said divisor and dividend, determining by machine a sequence of arithmetic operations in accordance with the value of the two most significant digits of the dividend, generating by machine a quotient digit from said arithmetic operations whereby the original dividend is reduced to a partial remainder, determining by machine a sequence of arithmetic operations in accordance with the value of the two most significant digits of the partial remainder, generating by machine another quotient digit from said arithmetic operations whereby the partial remainder is further reduced, and repeating said last determining and generating steps until a predetermined number of quotient digits have been generated.

10. A method of division employing over-and-over subtraction of a divisor or a multiple thereof from a dividend, which comprises:

performing the following steps within a computer: storing the multibit representation of the digits of said divisor, preconditioning the bit representation of the high order digital value of said divisor to assume a predetermined value, generating selective multiples of the conditioned divisor, storing said selective multiples, storing the multibit representation of the digits of said dividend, compensating said represented dividend in a manner which restores the original ratio between said divisor and dividend, determining a sequence of arithmetic operations in accordance with the value of the two most significant digits of the dividend or partial remainder thereof, generating a predetermined number of quotient digits from said arithmetic operations.

11. The method of claim 10 wherein the preconditioning step is such that the bit representation of the high order digital value of said divisor assumes a value of 0001.

12. The method of claim 11 wherein said arithmetic operations are successive subtractions of said multiples of the conditioned divisor from a particular digital position of the dividend or partial remainder thereof.

UNITED STATES PATENT OFFICE
CERTIFICATE OF CORRECTION

Patent No. 3,578,961 Dated May 18, 1971

Inventor(s) Ming-Tzer Miu

It is certified that error appears in the above-identified patent and that said Letters Patent are hereby corrected as shown below:

Column 8, line 47, after "has been added" insert -- to itself in said adder, the value registered in said counter being utilized subsequently to compensate the dividend so as to restore the ratio originally existing between said divisor and said dividend. --.

Signed and sealed this 17th day of August 1971.

(SEAL)
Attest:

EDWARD M.FLETCHER,JR.
Attesting Officer

WILLIAM E. SCHUYLER, JR.
Commissioner of Patents